US009886436B2

(12) United States Patent
Ghatage et al.

(10) Patent No.: US 9,886,436 B2
(45) Date of Patent: Feb. 6, 2018

(54) CONVERSION OF DOCUMENTS OF DIFFERENT TYPES TO A UNIFORM AND AN EDITABLE OR A SEARCHABLE FORMAT

(71) Applicant: Accenture Global Services Limited, Dublin (IE)

(72) Inventors: Prakash Ghatage, Bangalore (IN); Peter Dillon, Dublin (IE); Anil Mistry, Bedford (GB); Ramesh Jonnavithula, Bangalore (IN); Naveen Kumar Thangaraj, Salem (IN)

(73) Assignee: Accenture Global Services Limited, Dublin (IE)

( * ) Notice: Subject to any disclaimer, the term of this patent is extended or adjusted under 35 U.S.C. 154(b) by 315 days.

(21) Appl. No.: 14/634,302

(22) Filed: Feb. 27, 2015

(65) Prior Publication Data

US 2016/0132495 A1 May 12, 2016

(30) Foreign Application Priority Data

Nov. 6, 2014 (IN) .......................... 5583/CHE/2014

(51) Int. Cl.
*G06F 17/30* (2006.01)
*G06F 17/21* (2006.01)
*G06F 17/22* (2006.01)

(52) U.S. Cl.
CPC ...... *G06F 17/30011* (2013.01); *G06F 17/212* (2013.01); *G06F 17/22* (2013.01); *G06F 17/30569* (2013.01)

(58) Field of Classification Search
None
See application file for complete search history.

(56) References Cited

U.S. PATENT DOCUMENTS

| 5,131,053 A | 7/1992 | Bernzott et al. |
| 7,085,998 B2 * | 8/2006 | Kofman ................ G06F 3/1204 |
| | | 715/235 |

(Continued)

OTHER PUBLICATIONS

EMC Corporation, "Captiva Intelligent Enterprise Capture," http://www.emc.com/enterprisecontentmanagement/captiva/captivaiec.htm, Oct. 6, 2011, 2 pages.

(Continued)

*Primary Examiner* — Sangwoo Ahn
(74) *Attorney, Agent, or Firm* — Harrity & Harrity, LLP

(57) ABSTRACT

A device may obtain a set of documents, including at least two documents of different document types, for conversion to a uniform and an editable or a searchable format. The set of documents may include at least two documents of a different document type. The device may determine conversion information, associated with converting the set of documents, that includes an editable or a searchable document type to which the set of documents is to be converted. The device may determine zone information, associated with converting the set of documents, that includes information that identifies a portion of the set of documents that is to be converted. The device may generate a set of converted documents based on the conversion information and the zone information. Each document, of the set of converted documents, may be of the document type. The device may provide the set of converted documents.

20 Claims, 9 Drawing Sheets

(56) References Cited

U.S. PATENT DOCUMENTS

| | | | |
|---|---|---|---|
| 8,094,976 B2 | 1/2012 | Berard et al. | |
| 8,762,325 B2* | 6/2014 | Xiong | G06Q 10/06 707/609 |
| 2004/0240735 A1* | 12/2004 | Medina | G06K 9/00456 382/173 |
| 2005/0188305 A1* | 8/2005 | Costa | G06F 17/30011 715/234 |
| 2008/0130053 A1* | 6/2008 | Okamoto | G06K 9/2063 358/1.17 |
| 2008/0270879 A1* | 10/2008 | Komatsu | G06K 9/2063 715/200 |
| 2009/0094238 A1* | 4/2009 | Banerjee | G06F 17/30011 |
| 2011/0099184 A1* | 4/2011 | Symington | G06F 17/30716 707/755 |
| 2011/0310414 A1* | 12/2011 | Morimoto | G03G 15/5025 358/1.9 |
| 2013/0346361 A1* | 12/2013 | Hashimoto | G06F 17/30115 707/609 |
| 2013/0346506 A1* | 12/2013 | Zimmerman | G06Q 10/06 709/205 |
| 2015/0117721 A1* | 4/2015 | Rhodes | G06Q 10/10 382/112 |
| 2016/0117518 A1* | 4/2016 | Cao | G06F 21/6209 713/165 |

OTHER PUBLICATIONS

Neevia Technology, "Document Converter Pro: Product Description," https://neevia.com/products/dcpro/, Jun. 26, 2014, 1 page.

Online OCR, "Free Online OCR Service," http://www.onlineocr.net/, May 12, 2014, 1 page.

Neevia Technologies, "Products," https://neevia.com/products/, Apr. 20, 2010, 1 page.

OmniPage, "Don't Convert Documents, Transform Them!" http://www.nuance.com/for-business/by-product/omnipage/ultimate/index.htm, Apr. 29, 2013, 3 pages.

OCRonline, "Convert Scanned Documents to Text," http://www.oceronline.com, Jun. 13, 2010, 2 pages.

* cited by examiner

Zone Configuration

Add New Zone

Name: Date  
Page: 1  
Type: Flow ▶

Selection:  
X: 123  
Y: 18  
Width: 68  
Height: 14

[Add]

| Name | X | Y | W | H | Type | Page |
|---|---|---|---|---|---|---|
| Date | 123 | 18 | 68 | 14 | Flow | 1 |
| URN | 1 | 6 | 111 | 14 | Flow | 1 |
| Invoice No. | 275 | 18 | 65 | 14 | Flow | 1 |
| Info | 301 | 177 | 284 | 116 | Table | 2 |

Save Zone Template

Template Name: Setting 1

[Save]   [Use Setting]

FIG. 5B

FIG. 5E doc1.xls

|   | A | B |
|---|---|---|
| 1 | Date | 04-03-14 |
| 2 | URN | 984521 |
| 3 | Invoice | 418AWV |
| 4 | Info | None | doc2.xls

|   | A | B |
|---|---|---|
| 1 | Date | 05-06-13 |
| 2 | URN | 654135 |
| 3 | Invoice | 116AGV |
| 4 | Info | Customer Called regarding Order | doc3.xls

|   | A | B |
|---|---|---|
| 1 | Date | 09-15-14 |
| 2 | URN | 745122 |
| 3 | Invoice | 874BCR |
| 4 | Info | Item Requested by 10-15-14 |

500

CONVERSION OF DOCUMENTS OF DIFFERENT TYPES TO A UNIFORM AND AN EDITABLE OR A SEARCHABLE FORMAT

RELATED APPLICATION

This application claims priority under 35 U.S.C. §119 to Indian Provisional Patent Application No. 5583/CHE/2014, filed on Nov. 6, 2014, the content of which is incorporated by reference herein in its entirety.

BACKGROUND

Optical character recognition (OCR) technology may allow text included in a document (e.g., a scanned paper document, a portable document format (PDF) file, an image file, etc.) to be recognized and/or converted into an editable and/or searchable format (e.g., a text document, a Microsoft Word document, a Microsoft Excel document, etc.).

SUMMARY

According to some possible implementations, a device may include one or more processors to: obtain a set of documents for conversion to a uniform and an editable or a searchable format, where the set of documents may include at least two documents of different document types; determine conversion information associated with converting the set of documents, where the conversion information may include a document type to which the set of documents is to be converted, and where the document type may be a type of document that is at least one of editable or searchable; determine zone information associated with converting the set of documents, where the zone information may include information that identifies a portion of the set of documents that is to be converted, and where the portion of the set of documents may be less than the entire set of documents; generate a set of converted documents, where the set of converted documents may be generated based on the conversion information and the zone information, and where each document, of the set of converted documents, may be of the document type; and provide the set of converted documents.

According to some possible implementations, a computer-readable medium may store one or more instructions that, when executed by one or more processors, cause the one or more processors to: obtain a plurality of documents for conversion to a uniform and an editable or a searchable format, where the plurality of documents may include at least two documents of different document types; receive conversion information associated with converting the plurality of documents, where the conversion information may include a document type to which the plurality of documents is to be converted, and where the document type may be a type of document that is at least one of editable or searchable; receive zone information associated with converting the plurality of documents, where the zone information may include information that identifies an area of the plurality of documents that is to be converted; create a plurality of converted documents, where the plurality of converted documents may be created based on the conversion information and the zone information, and where each document, of the plurality of converted documents, may be of the document type; and provide the plurality of converted documents.

According to some possible implementations, a method may include: retrieving, by a device, a set of documents for conversion to a uniform and an editable or a searchable format using optical character recognition (OCR), where the set of documents may include at least two documents of different document types; obtaining, by the device, conversion information associated with converting the set of documents, where the conversion information may include a document type to which the set of documents is to be converted, and where the document type may be a type of document that is at least one of editable or searchable; obtaining, by the device, zone information associated with converting the set of documents, where the zone information may include information that identifies a portion of the set of documents that is to be converted; generating, by the device and based on the conversion information and the zone information, a set of converted documents based on performing OCR on the set of documents, where each document, of the set of converted documents, may be of the document type; and providing, by the device, the set of converted documents for access by a user device.

BRIEF DESCRIPTION OF THE DRAWINGS

FIGS. 5A-5E are diagrams of an example implementation relating to the example process shown in FIG. 4.

DETAILED DESCRIPTION

The following detailed description of example implementations refers to the accompanying drawings. The same reference numbers in different drawings may identify the same or similar elements.

A user may wish to convert a set of electronic documents (herein referred to as documents), such as (e.g., scanned paper documents, portable document format (PDF) files, image files, etc.) into a uniform and an editable and/or searchable format (e.g., a text document, a Microsoft Word document, a Microsoft Excel document, etc.) by extracting information from the set of documents (e.g., by performing optical character recognition (OCR), by reading the set of documents, etc.). For example, a member of a business operations team may wish to convert (e.g., by performing OCR, by reading the set of documents, etc.) financial information from a set of scanned documents that includes invoices, purchase orders, bank statements, or the like, to an editable and/or a searchable format. However, as a quantity of documents, an amount of information included in the documents, and/or a size of the documents increase, a cost associated with converting the documents (e.g., in computing resources, in time to perform OCR, in time required by the user, etc.) may increase. Implementations described herein may provide a solution that allows for improved performance associated with converting a set of documents to a uniform and an editable and/or searchable format when extracting information from the set of documents (e.g., by performing OCR, by reading the set of documents, etc.).

Figure 1:
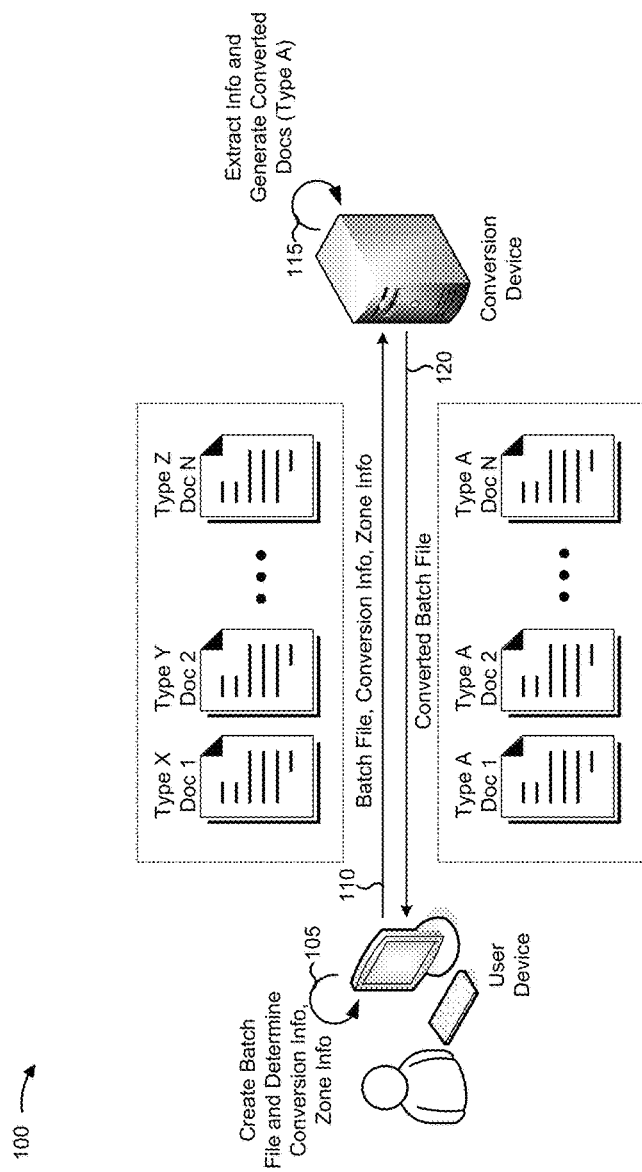
FIG. 1 is a diagram of an overview of an example implementation described herein.

FIG. 1 is a diagram of an overview of an example implementation 100 described herein. For the purposes of example implementation 100, assume that a user device stores or has access to a set of documents (e.g., document 1 through document N) of various document types (e.g., type X, type Y, type Z, etc.). Further, assume that a user of the user device wishes for the set of documents to be converted to a uniform and an editable and/or searchable format by extracting information from the set of documents (e.g., by performing OCR, by reading the set of documents, etc.).

As shown in FIG. 1, and by reference number 105, the user device may create a batch file (e.g., an archive file, a compressed file, etc.) that includes the set of documents. As further shown, the user device may determine (e.g., based on user input) conversion information associated with converting the set of documents. The conversion information may include, for example, a particular document type (e.g., type A) to which the set of documents is to be converted, a language included in the set of documents, and/or other information associated with converting the set of documents.

As further shown, the user device may also determine (e.g., based on user input) zone information associated with converting the set of documents. Zone information may include information that identifies a portion (e.g., a region, an area, a section, etc.) of a document that is to be converted to an editable and/or a searchable format. In other words, the zone information may indicate that information need only be extracted from the portion of the document described by the zone information.

As shown by reference number 110, the user device may provide, to a conversion device, the batch file, the conversion information, and the zone information. As shown by reference number 115, the conversion device may receive the batch file, the conversion information, and the zone information, may extract information from each document (e.g., by performing OCR) included in the batch file (e.g., based on the zone information), and may generate a set of converted documents (of the particular document type). The conversion device may also create a batch file that includes the set of converted documents. As shown by reference number 120, the conversion device may provide the batch file, including the set of converted documents, to the user device (e.g., such that the user may view, access, manipulate, etc. the set of converted documents as desired). As such, the user device need only provide a single batch file (including documents of different types) for remote information extraction processing based on conversion information and/or zone information specified by the user. In this way, performance associated with converting a set of documents to an editable and/or searchable format by extracting information from the set of documents (e.g., by performing OCR, by reading the set of documents, etc.) may be improved (e.g., with regard to reducing user interaction, use of computing resources for sending and/or receiving documents, use of computing resources to perform OCR, etc.).

Figure 2:
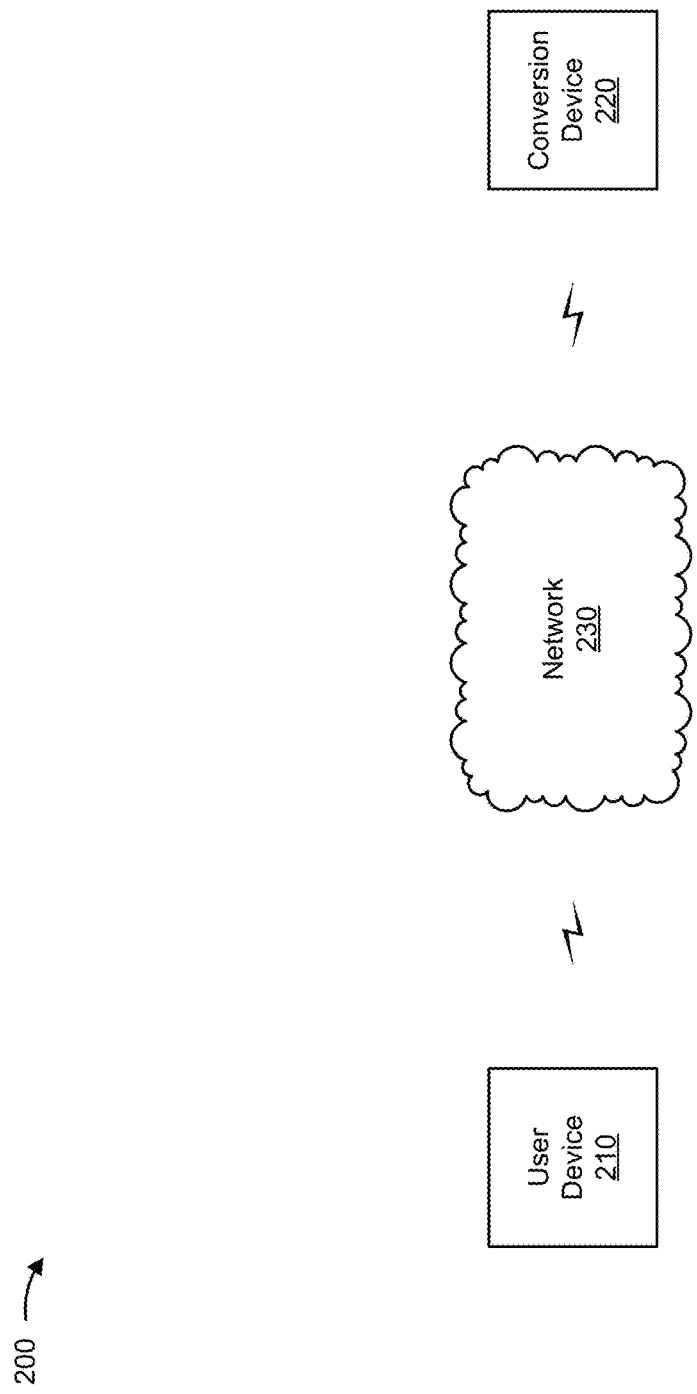
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a conversion device 220, and a network 230. Devices of environment 200 may interconnect via wired connections, wireless connections, or a combination of wired and wireless connections.

User device 210 may include one or more devices capable of receiving, generating, storing, processing, and/or providing information associated with a set of documents for conversion to a uniform and editable and/or search format. For example, user device 210 may include a mobile phone (e.g., a smart phone, a radiotelephone, etc.), a laptop computer, a tablet computer, a handheld computer, a desktop computer, or a similar device. In some implementations, user device 210 may receive information from and/or transmit information to another device in environment 100, such as conversion device 220.

Conversion device 220 may include one or more devices capable of receiving, determining storing, processing, and/or providing information associated with a set of documents for conversion to a uniform and editable and/or search format (e.g., by performing OCR, by reading the set of documents, etc.). For example, conversion device 220 may include a server device or a collection of server devices. In some implementations, conversion device 220 may include a communication interface that allows conversion device 220 to receive information from and/or transmit information to other devices in environment 100. In some implementations, conversion device 220 may host and/or have access to an OCR application associated with converting documents into an editable and/or searchable format. Additionally, or alternatively, conversion device 220 may be capable of extracting information from the set of documents. Additionally, or alternatively, conversion device 220 may be capable of generating and/or creating a set of converted documents the corresponds to the set of documents.

Network 230 may include one or more wired and/or wireless networks. For example, network 230 may include a cellular network (e.g., a long term evolution network, a third generation network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
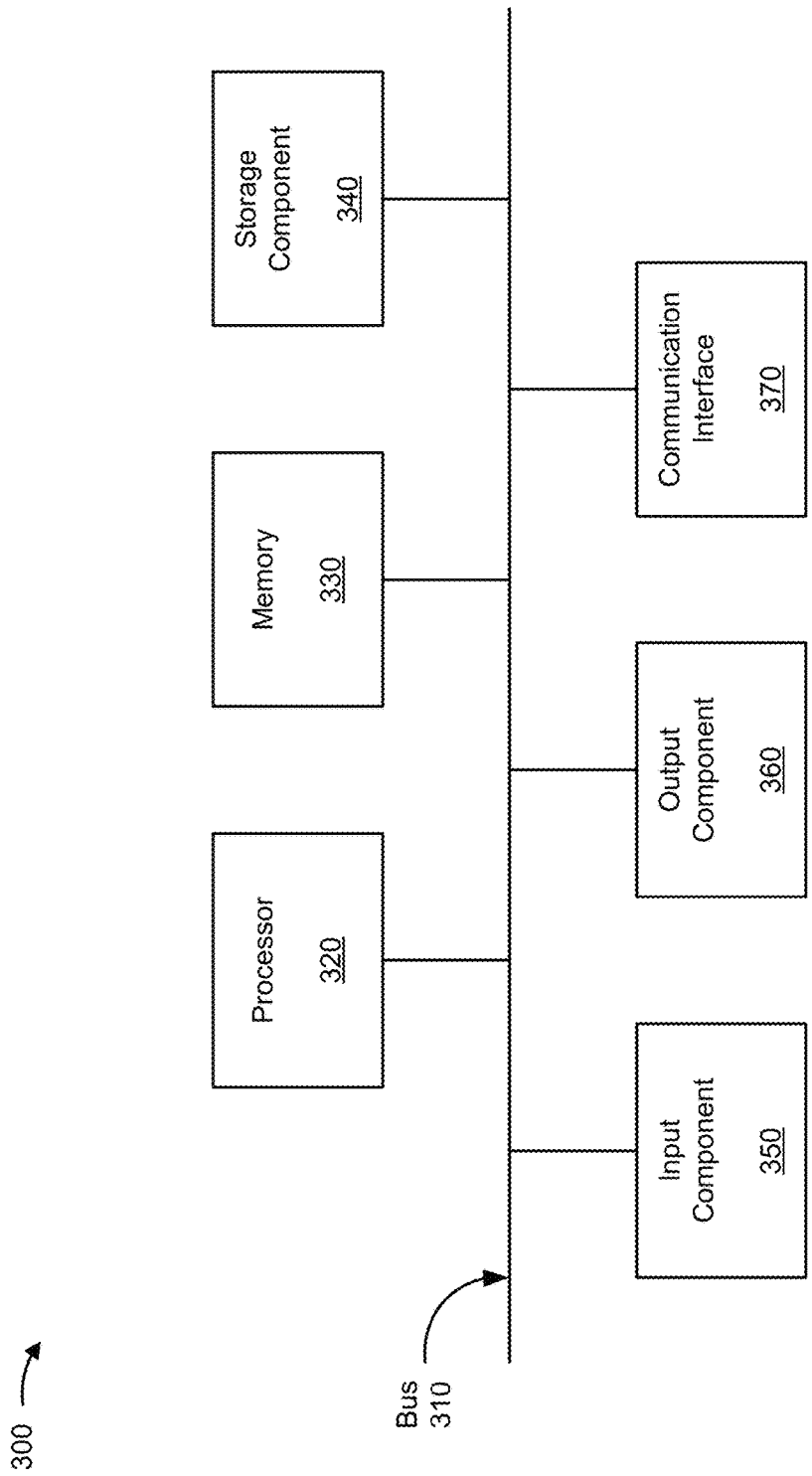
FIG. 3 is a diagram of example components of one or more devices of FIG. 2.

FIG. 3 is a diagram of example components of a device 300. Device 300 may correspond to user device 210 and/or conversion device 220. In some implementations, user device 210 and/or conversion device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
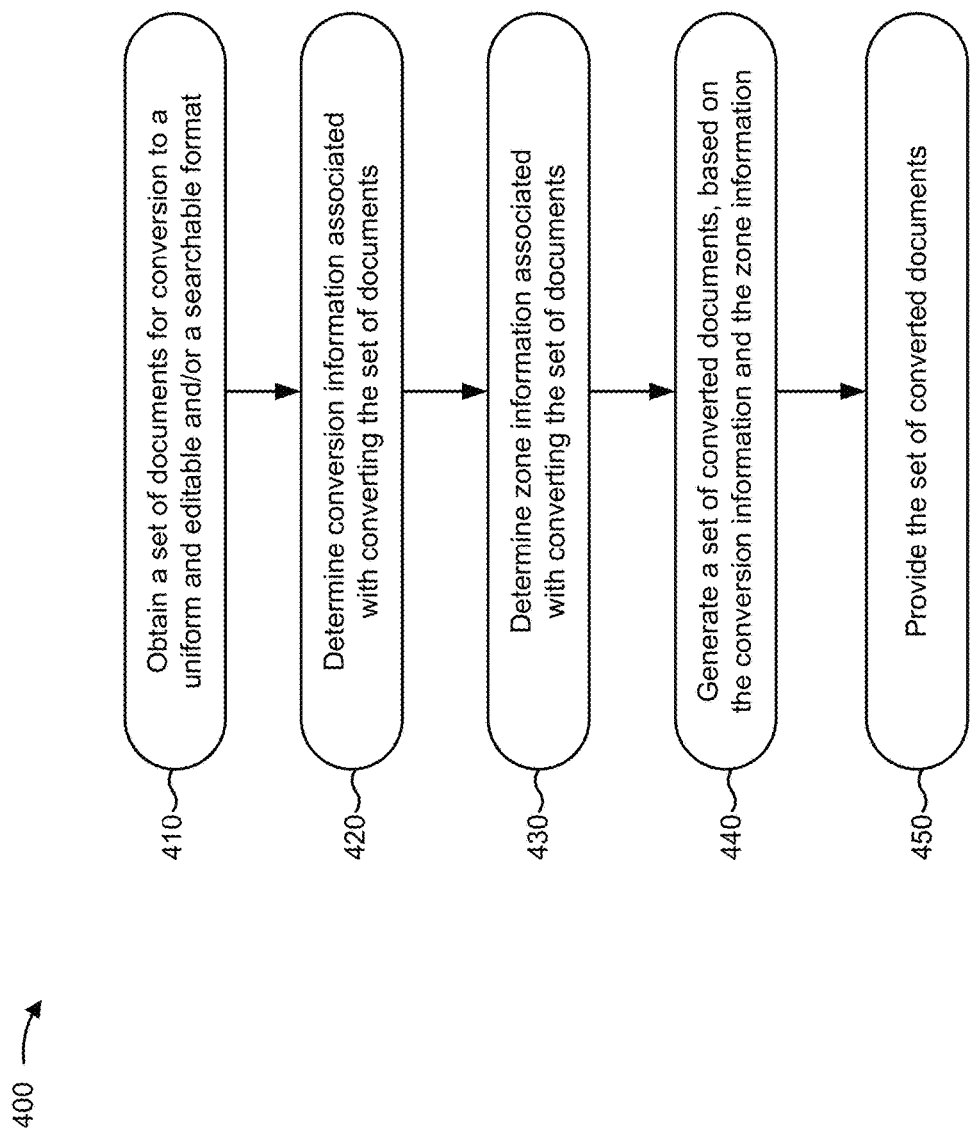
FIG. 4 is a flow chart of an example process for converting a set of documents to an editable and/or a searchable format based on conversion information and zone information associated with converting the set of documents.

FIG. 4 is a flow chart of an example process 400 for converting a set of documents to an editable and/or a searchable format based on conversion information and zone information associated with converting the set of documents. In some implementations, one or more process blocks of FIG. 4 may be performed by conversion device 220. In some implementations, one or more process blocks of FIG. 4 may be performed by another device or a set of devices separate from or including conversion device 220, such as user device 210.

As shown in FIG. 4, process 400 may include obtaining a set of documents for conversion to a uniform and an editable and/or searchable format (block 410). For example, conversion device 220 may obtain a set of documents for conversion to a uniform and an editable and/or searchable format. In some implementations, conversion device 220 may obtain the set of documents based on another device (e.g., user device 210) providing the set of documents. Additionally, or alternatively, conversion device 220 may obtain the set of documents based on requesting and/or retrieving the set of documents from the other device. Additionally, or alternatively, conversion device 220 may obtain the set of documents based on information (e.g., provided by user device 210) identifying a storage location of the set of documents, and conversion device 220 may obtain the set of documents from the identified storage location.

In some implementations, the set of documents may include one or more documents of that may not be in a uniform and an editable and/or searchable format, such as PDF files, image files, or the like. In some implementations, the set of documents may include information that a user wishes to convert to an editable and/or searchable format (e.g., based on extracting the information from the set of documents using OCR), such as information included in a set of documents that includes invoices, purchase orders, bank statements, or the like.

In some implementations, the set of documents may be included in a batch file (e.g., a single file that includes the set of documents, such as an archive file, a compressed file, etc.). In some implementations, user device 210 may create the batch file that includes the set of documents. For example, user device 210 may allow a user to provide, via a user interface, input that identifies each document of the set of documents, and user device 210 may create the batch file based on the user input. Here, user device 210 may provide the batch file to conversion device 220 and/or to a shared memory storage location accessible by user device 210 and/or conversion device 220.

In some implementations, conversion device 220 may obtain the set of documents from user device 210. For example, user device 210 may provide (e.g., based on an indication from the user) the set of documents to conversion device 220. As another example, user device 210 may create the batch file that includes the set of documents, as described above, and may provide (e.g., via an Internet-based application) the batch file to conversion device 220.

Additionally, or alternatively, conversion device 220 may obtain the set of documents from a shared memory storage location accessible by conversion device 220. For example, user device 210 may store the set of documents in a memory location (e.g., a SharePoint document library, a secure file transfer protocol folder, etc.) accessible by both user device 210 and conversion device 220. Here, conversion device 220 may obtain the set of documents from the shared memory location. In some implementations, this process may be referred to as offline processing. Configuring conversion device 220 to obtain the set of documents in this way may allow for improved performance. For example, allowing user device 210 to provide, to conversion device 220, a set of documents that exceeds a particular size (e.g., 5 megabytes, 10 megabytes, 1 gigabyte, etc.) may result in inefficient use of computing resources (e.g., when the set of documents is uploaded to conversion device 220 and a converted set of documents is stored by the conversion device 220, etc.). Offline processing may allow user device 210 to store the set of documents in the shared memory storage location, and conversion device 220 may obtain the set of documents from the shared memory storage location, generate a set of converted documents, and store the set of converted documents in the shared memory storage location.

In some implementations, the set of documents may include at least two documents of a different document type. For example, the set of documents may include at least two documents of different document types, such as a PDF, a bitmap (BMP) file, a tagged image file (TIF), a portable network graphics (PNG) file, a joint photographic experts group (JPG) file, a text document (e.g., comma separated, with line breaks, etc.), a Microsoft Word document, an electronic publication (ePub) document, a Microsoft Excel document, a HyperText Markup Language (HTML) document (e.g., version 3.2, version 4.0, etc.), an InfoPath document, a Kindle document, a searchable PDF document, a Microsoft PowerPoint document, a Microsoft Publisher document, a Unicode text document (e.g., comma separated, formatted, with line breaks, etc.), a WordPad document, a searchable image document, or another type of document.

As further shown in FIG. 4, process 400 may include determining conversion information associated with converting the set of documents (block 420). For example, conversion device 220 may determine conversion information associated with converting the set of documents. In some implementations, conversion device 220 may determine the conversion information after user device 210 provides the conversion information. Additionally, or alternatively, conversion device 220 may determine the conversion information when conversion device 220 receives (e.g., based on a configuration of conversion device 220) an indication to determine the conversion information.

Conversion information may include information associated with a manner in which the set of documents is to be converted into a uniform and an editable and/or a searchable format. For example, the conversion information may include information that identifies one or more document types of the set of documents. As another example, the conversion information may include information that identifies a document type to which the set of documents is to be converted, such as a text document, a Microsoft Word document, an ePub document, a Microsoft Excel document, a HTML document, an InfoPath document, a Kindle document, a searchable PDF document, a Microsoft PowerPoint document, a Microsoft Publisher document, a Unicode text document, a WordPad document, a searchable image document, or another type of editable and/or searchable document. As another example, the conversion information may include layout information associated with converting the set of documents (e.g., information indicating how the information, extracted from the set of documents, is to be organized in a converted set documents of the specified document type, etc.)

As still another example, the conversion information may include information that indicates whether conversion device 220 is to provide a converted set of documents to user device 210, a shared memory storage location, or the like. As yet another example, the conversion information may include information that identifies a language included in the set of documents (e.g., English, French, Spanish, German, etc.). Additionally, or alternatively, the conversion information may include another type of information associated with a manner in which the set of documents is to be converted into a uniform and an editable and/or searchable format.

In some implementations, conversion device 220 may determine the conversion information based on user input. For example, the user may provide, via a user interface displayed by user device 210, conversion information that identifies the document type to which the set of documents is to be converted. Here, user device 210 may provide the conversion information to conversion device 220.

Additionally, or alternatively, conversion device 220 may determine the conversion information based on the set of documents. For example, conversion device 220 may obtain the set of documents, and may inspect one or more documents, included in the set of documents, in order identify the one or more document types of the set of documents. As another example, conversion device 220 may obtain the set of documents, and may inspect one or more documents, included in the set of documents, in order to identify (e.g., based on information stored or accessible by conversion device 220) one or more languages included in the set of documents.

Additionally, or alternatively, conversion device 220 may determine the conversion information based on a configuration of conversion device 220. For example, conversion device 220 may determine (e.g., based on a configuration of conversion device 220) information that identifies a default document type to which the set of documents is to be converted (e.g., when the user does not specify a desired document type).

As further shown in FIG. 4, process 400 may include determining zone information associated with converting the set of documents (block 430). For example, conversion device 220 may determine zone information associated with converting the set of documents. In some implementations, conversion device 220 may determine the zone information based on user device 210 providing the zone information. Additionally, or alternatively, conversion device 220 may determine the zone information when conversion device 220 receives (e.g., based on a configuration of conversion device 220) an indication to determine the zone information.

Zone information may include information that identifies a portion of a document that is to be converted to a uniform and an editable and/or a searchable format. In some implementations, the zone information may indicate that portions of the document not included in a zone (e.g., a zone described by the zone information) are not to be converted. In some implementations, the zone information may be associated with a portion of the document (e.g., a bottom half of a page in the document, a rectangular area included in the page of the document, a set of pages included in the document, etc.). In some implementations, the zone information may be associated with different portions of the document (e.g., the zone information may describe a first rectangular area in the page of the document and a second rectangular area in the page of the document, etc.).

In some implementations, the zone information may include information associated with different sets of zones to be applied to the set of documents. For example, the zone information may include first zone information (e.g., describing a first zone) that corresponds to a first document type and second zone information (e.g., describing a second zone) that corresponds to a second document type. Here, conversion device 220 may extract information from and convert a first subset documents (e.g., PDF documents), of the set of documents, based on the first zone information, and may perform OCR and convert a second subset documents (e.g., TIF documents), of the set of documents, based on the second zone information.

In some implementations, conversion device 220 may determine the zone information based on user input. For example, the user may provide (e.g., via a user interface displayed by user device 210) zone information that describes a zone, such as a zone identifier (e.g., invoice number, date, etc.), an X-Y coordinate associated with the zone (e.g., that identifies a corner of the zone), a height associated with the zone (e.g., in inches, in pixels, etc.), a width associated with the zone (e.g., in inches, in pixels, etc.), a type of information included in the zone (e.g., a table, a word flow, an automatic setting that allows conversion device 220 to determine the type of information included in the zone, etc.), a page number associated with the zone (e.g., when the document includes more than one page and the zone is associated with a particular page), and/or any other information that could be used, by conversion device 220, to identify the boundaries of the zone. In some implementations, the user may provide the zone information via an input element of the user interface, such as a text box, a drop down menu, a check box, or the like. Additionally, or alternatively, the user may provide the zone information by interacting with the user interface, such as by clicking and dragging in order to create a window that identifies the zone. In some implementations, the zone information may include information that describes multiple zones (e.g., associated with multiple portions of the document).

In some implementations, the zone information may be stored (e.g., by conversion device 220, by user device 210, etc.) for future use. For example, conversion device 220 and/or user device 210 may store the zone information, input by the user, as a zone template such that the zone template may be used for conversion of another set of documents in the future.

In some implementations, conversion device 220 may determine the zone information based on stored zone information. For example, as described above, user device 210 and/or conversion device 220 may store a zone template. Here, conversion device 220 may determine the zone information based on the stored zone template (e.g., when the user indicates that the zone template is to be used for conversion of the set of documents).

By allowing for conversion of the set of documents based on the zone information (e.g., by performing OCR on and converting only those portions of the set of documents described by the zone information), more efficient use of computing resources and/or a faster conversion time may be achieved (e.g., as compared to performing OCR on and converting all information included in the set of documents).

As further shown in FIG. 4, process 400 may include generating a set of converted documents based on the set of documents, the conversion information, and the zone information (block 440). For example, conversion device 220 may generate a set of converted documents based on the set of documents, the conversion information, and the zone information. In some implementations, conversion device 220 may generate the set of converted documents after conversion device 220 obtains the set of documents, determines the conversion information, and determines the zone information. Additionally, or alternatively, conversion device 220 may generate the set of converted documents when conversion device 220 receives an indication to generate the set of converted documents.

In some implementations, conversion device 220 may generate the set of converted documents using an OCR application stored or accessible by conversion device 220. In some implementations, conversion device 220 may use the OCR application to perform OCR on a document of the set of documents (e.g., in order to extract information the set of documents). Here, conversion device 220 may generate a converted document, corresponding to the document, based on the information extracted using OCR.

Additionally, or alternatively, conversion device 220 may generate the set of converted documents in another manner. For example, conversion device 220 may extract information from a document, of the set of documents, by reading the document (e.g., when the document includes machine-readable text), and may generate a converted document, corresponding to the document, based on the information extracted by reading the document.

In some implementations, conversion device 220 may generate the set of converted documents based on the zone information. For example, conversion device 220 may perform OCR on a portion of a document, of the set of documents, that is described by the zone information. As another example, conversion device 220 may read a portion of a document, of the set of documents, that is described by the zone information.

Additionally, or alternatively, conversion device 220 may generate the set of converted documents based on the conversion information. For example, conversion device 220 may generate the set of converted documents such that each converted document, of the set of converted documents, is of a document type identified by the conversion information. As a particular example, conversion device 220 may perform OCR and/or read a set of documents that includes PDF files, TIFs, and Microsoft Word files, and may generate the set of converted documents such that each converted document, of the set of converted documents, is a Microsoft Excel document. Here, conversion device 220 may generate the set of converted documents based on layout information that describes how each document, of the set of converted documents, is to be organized.

Additionally, or alternatively, conversion device 220 may generate the set of documents and may include the set of converted documents in a batch file. In some implementations, conversion device 220 may create the batch file based on the conversion information (e.g., when the conversion information indicates that conversion device 220 is to create the batch file).

As further shown in FIG. 4, process 400 may include providing the set of converted documents (block 450). For example, conversion device 220 may provide the set of converted documents. In some implementations, conversion device 220 may provide the set of converted documents after conversion device 220 generates the set of converted documents. Additionally, or alternatively, conversion device 220 may provide the set of converted documents when conversion device 220 receives an indication to provide the set of converted documents.

In some implementations, conversion device 220 may provide the set of converted documents to user device 210. For example, conversion device 220 may provide the set of converted documents to user device 210 (e.g., individually) and/or may provide the batch file including the set of converted documents to user device 210 (e.g., such that the user may view and/or access the set of converted documents).

Additionally, or alternatively, conversion device 220 may provide the set of converted documents to the shared memory storage location accessible by user device 210 and conversion device 220. For example, conversion device 220 may provide the set of converted documents to the shared memory storage location such that user device 210 may obtain the set of converted documents at a later time. In some implementations, conversion device 220 may provide a notification (e.g., a text message, an email, an alert, etc.) to user device 210 indicating that the set of converted documents is available for retrieval and/or access by user device 210.

Additionally, or alternatively, conversion device 220 may store the set of converted documents, and may provide the set of converted documents at a later time (e.g., based on a request provided by user device 210). In some implementations, conversion device 220 may store the set of converted documents for a period of time (e.g., a week, 30 days, etc.), after which the set of converted documents may be deleted (e.g., if user device 210 has not retrieved the set of converted documents when the period of time expires). Additionally, or alternatively, conversion device 220 may delete the set of converted documents after providing the set of converted documents (e.g., to user device 210, to the shared memory storage location, etc.).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. For the purposes of example implementation 500, assume that user device 210 (e.g., UD1) stores a set of documents (e.g., doc1.pdf, doc2.tif, and doc3.bmp), and that a user of UD1 wishes for the set of documents to be converted to an editable and/or searchable format.

Figure 5A:
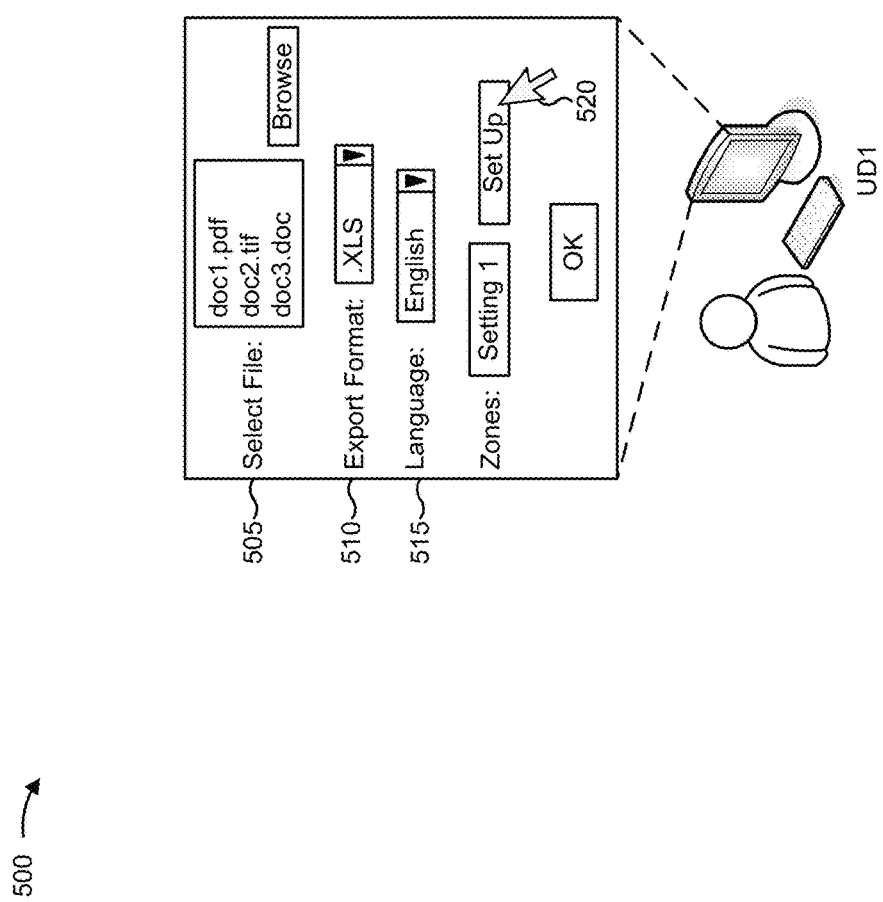

As shown in FIG. 5A, and by reference number 505, the user may provide (e.g., by selecting a Browse button of a user interface and selecting each document of the set of documents in a selection window) information that identifies the set of documents. As shown by reference numbers 510 and 515, the user may also provide (e.g., via corresponding drop down menus) conversion information that identifies a document type to which the set of documents is to be converted (e.g., a Microsoft Excel file (XLS)), and information that identifies a language included in the set of documents (e.g., English), respectively. As shown by reference number 520, the user may also indicate (e.g., by selecting a Set Up button) that the user wishes to provide zone information associated with converting the set of documents.

FIG. 5B shows a diagram of an example user interface that allows the user to input the zone information. As shown in the upper portion of the example user interface of FIG. 5B, the user may provide (e.g., via text boxes, drop down menus, etc.) information that describes a first zone (e.g., portion) of each document, of the set of documents, that is to be converted to an editable and/or searchable format. As shown, the zone information may include information that identifies a name of the zone (e.g., Name: Date), information that identifies a page number of the zone with each document (e.g., Page: 1), information that identifies boundaries of the zone based on an X-Y coordinate system (e.g., Selection: X=123, Y=18, Width=68, Height=14), and information that identifies a type of information included in the zone (e.g., Type: Flow). As further shown, the user may add the first zone to the zone information (e.g., by selecting an Add button).

As shown by the middle portion of the example user interface of FIG. 5B, the user may similarly input information that describes a second zone (e.g., a URN zone), a third zone (e.g., an Inv. No. zone), and a fourth zone (e.g., an Info zone). As shown by the lower portion of the example user interface of FIG. 5B, the user may input (e.g., via a text box) a zone template name (e.g., setting 1) that may be used to identify the zone information. As further shown, the user indicate (e.g., by selecting a Use Setting button) that the specified zone information (e.g., the set of zones associated with setting 1), is to be used when converting the set of documents. As shown, the user may also indicate (e.g., by selecting a Save button), that that zone information is to be saved for future use.

Figure 5C:
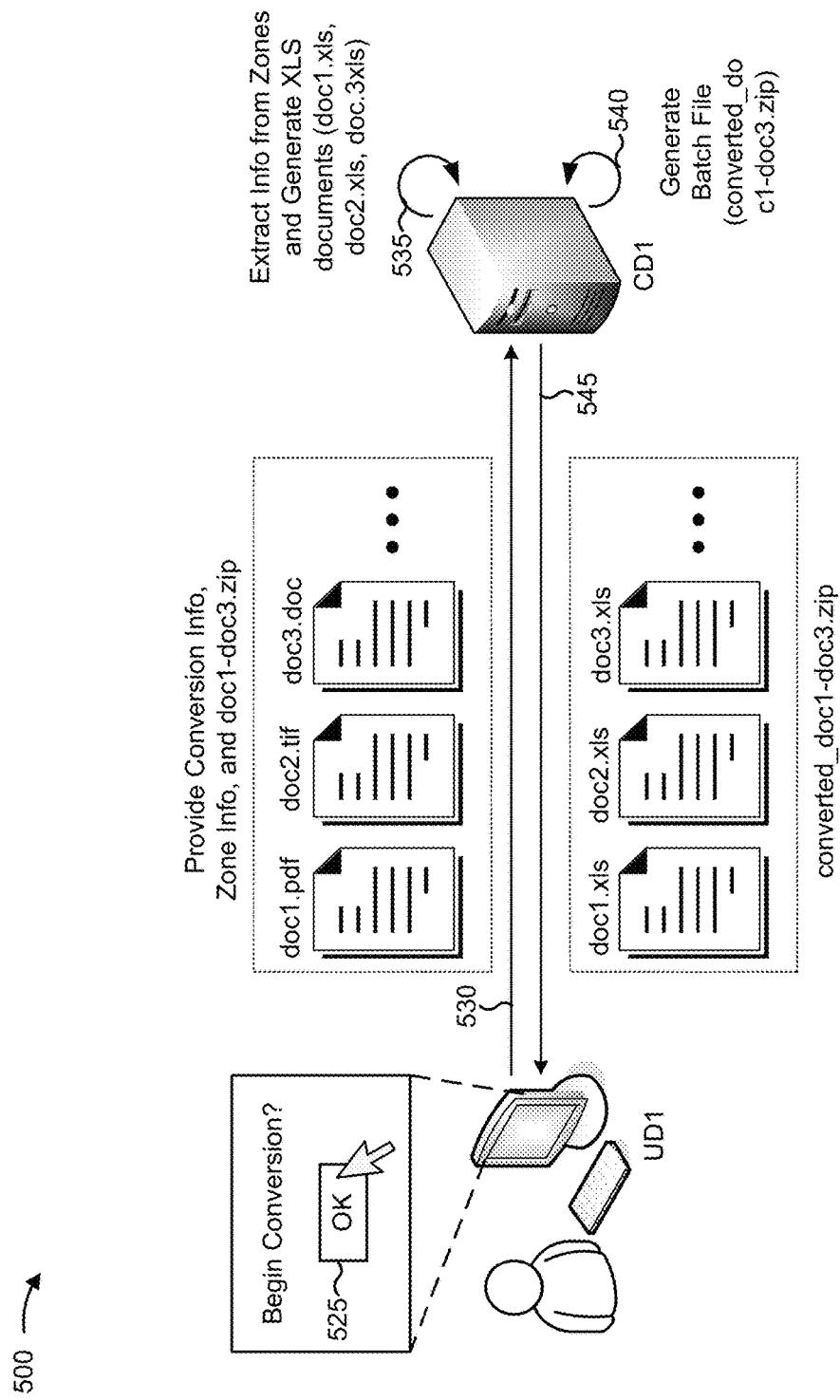

As shown in FIG. 5C, and by reference number 525, the user may indicate (e.g., by selecting an OK button) that the set of documents is to be provided for conversion. For the purposes of example implementation 500, assume that UD1 creates a batch file (e.g., doc1-doc3.zip) that includes the set of documents. As shown by reference number 530, UD1 may provide the batch file, the conversion information, and the zone information to conversion device 220 (e.g., CD1). As shown by reference number 535, CD1 may receive the batch file, the conversion information, and the zone information, may extract the information from the set of documents (e.g., by performing OCR on doc1.pdf and doc2.tif and by reading doc3.doc), based on the zone information (e.g., in the Date zone, the URN zone, the Inv. No. zone, and the Info zone) and may generate a corresponding set of converted documents (e.g., doc1.xls, doc2.xls, and doc3.xls) that includes only information included in the specified zones. For the purposes of example implementation 500, assume, since the conversion information did not include layout information associated with generating the set of converted documents, that CD1 generates the set of converted documents using a default layout. As shown by reference number 540, CD1 may generate a batch file that includes the set of converted documents (e.g., converted doc1-doc3.zip). As shown by reference number 545, CD1 may provide the set of converted documents to UD1. UD1 may receive the set of converted documents, and the user may view and/or access the set of converted documents accordingly.

Figure 5D:

FIG. 5D shows a diagram of an example user interface that allows the user to view and/or access the set of converted documents. As shown, the user interface may include information that identifies each document of the set of documents (e.g., under a File Name column), information that identifies the batch file that includes the set of documents (e.g., under a Batch Name column), information that identifies a document type of the set of converted documents (e.g., under a Conversion Format column), information that identifies each converted document of the set of converted documents (e.g., under a Processed File Name column), information that identifies a status of the conversion of each document of the set of documents (e.g., under a Processing Status column), information that identifies a time at which the set of documents was provided for conversion (e.g., under an Upload On column), and information that identifies a time at which the set of documents was converted (e.g., under a Processed At column). In some implementations, the user may view and/or access a converted document via the user interface, for example, by selecting (e.g., double clicking, hovering over for a period of time) the converted document within the user interface.

FIG. 5E shows diagrams of example user interfaces of the set of converted documents generated by CD1. As shown, each converted document, of the set of converted documents, may be of the same document type (e.g., a Microsoft Excel file), and the organization of the information included in the set of converted documents may be uniform (e.g., each date is included in cell B1, each URN is included in cell B2, each invoice number is included in cell B3, each order note (e.g., identified as info) is included in cell B4, etc.).

As indicated above, FIGS. 5A-5E are provided merely as an example. Other examples are possible and may differ from what was described with regard to FIGS. 5A-5E.

Implementations described herein may provide a solution that allows for improved performance associated with converting a set of documents to a uniform and an editable and/or searchable format when extracting information from the set of documents (e.g., by performing OCR, by reading the set of documents, etc.).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    one or more processors to:
        obtain a first batch file including a set of documents for conversion to a uniform and an editable or a searchable format,
            the set of documents including at least two documents of different document types;
        determine conversion information associated with converting the set of documents,
            the conversion information including a document type to which the set of documents is to be converted,
            the document type being a type of document that is at least one of editable or searchable;
        determine zone information, associated with converting the set of documents, based on user input that specifies the zone information,
            the zone information including:
                a name of a zone of each document, of the set of documents, that is to be converted,
                first information that identifies a page number of the zone, and
                second information that identifies boundaries of the zone based on an X-Y coordinate system;
        generate a second batch file including a set of converted documents,
            the set of converted documents being generated by converting the set of documents based on the conversion information and the zone information, and
            each document, of the set of converted documents, being of the document type; and
        provide the second batch file including the set of converted documents.

2. The device of claim 1, where the set of documents includes at least one of:
    a portable document format (PDF) file;
    a bitmap (BMP) file;
    a tagged image file (TIF);
    a portable network graphics (PNG) file;
    a joint photographic experts group (JPG) file;
    a text document;
    a Microsoft Word document;
    an electronic publication (ePub) document;
    a Microsoft Excel document;
    a HyperText Markup Language (HTML) document;
    an InfoPath document;
    a Kindle document;
    a searchable PDF document;

a Microsoft PowerPoint document;
a Microsoft Publisher document;
a Unicode text document;
a Word Pad document; or
a searchable image document.

3. The device of claim 1, where the one or more processors are further to:
 generate the set of converted documents based on information extracted by performing optical character recognition on the set of documents.

4. The device of claim 1, where the one or more processors are further to:
 generate the set of converted documents based on reading information from the set of documents.

5. A computer-readable medium storing instructions, the instructions comprising:
 one or more instructions that, when executed by one or more processors, cause the one or more processors to:
  obtain a first batch file including a plurality of documents for conversion to a uniform and an editable or a searchable format,
   the plurality of documents including at least two documents of different document types;
  receive conversion information associated with converting the plurality of documents,
   the conversion information including a document type to which the plurality of documents is to be converted,
    the document type being a type of document that is at least one of editable or searchable;
  identify zone information, associated with converting the plurality of documents, based on user input that specifies the zone information,
   the zone information including:
    a name of a zone of each document, of the plurality of documents, that is to be converted,
    first information that identifies a page number of the zone, and
    second information that identifies boundaries of the zone based on an X-Y coordinate system;
  create a second batch file including a plurality of converted documents,
   the plurality of converted documents being created by converting the plurality of documents based on the conversion information and the zone information, and
   each document, of the plurality of converted documents, being of the document type; and
  provide the second batch file including the plurality of converted documents.

6. The computer-readable medium of claim 5, where the one or more instructions, that cause the one or more processors to obtain the first batch file including the plurality of documents, cause the one or more processors to:
 obtain the first batch file including the plurality of documents from a shared memory storage location accessible by a user device.

7. The computer-readable medium of claim 5, where the user input comprises information associated with a window specified by a user.

8. The computer-readable medium of claim 5, where the one or more instructions further cause the one or more processors to:
 create the plurality of converted documents based on information extracted by performing optical character recognition on the plurality of documents.

9. The computer-readable medium of claim 5, where the one or more instructions, that cause the one or more processors to provide the second batch file including the plurality of converted documents, cause the one or more processors to:
 provide the second batch file including the plurality of converted documents to a shared memory storage location accessible by a user device.

10. A method, comprising:
 retrieving, by a device, a first batch file including a set of documents for conversion to a uniform and an editable or a searchable format using optical character recognition (OCR),
  the set of documents including at least two documents of different document types;
 obtaining, by the device, conversion information associated with converting the set of documents,
  the conversion information including a document type to which the set of documents is to be converted,
   the document type being a type of document that is at least one of editable or searchable;
 obtaining, by the device, zone information, associated with converting the set of documents, based on user input that specifies the zone information,
  the zone information including:
   a name of a zone of each document, of the set of documents, that is to be converted,
   first information that identifies a page number of the zone, and
   second information that identifies boundaries of the zone based on an X-Y coordinate system;
 generating, by the device and based on the conversion information and the zone information, a second batch file including a set of converted documents by converting the set of documents,
  each document, of the set of converted documents, being of the document type; and
 providing, by the device the second batch file including the set of converted documents for access by a user device.

11. The method of claim 10, where retrieving the set of documents comprises:
 retrieving a batch file from a shared memory storage location,
  the batch file including the set of documents, and
  the shared memory storage location being accessible by the user device.

12. The method of claim 10, where the user input indicates that a zone template is to be used for the zone information.

13. The method of claim 10, where obtaining the zone information comprises:
 obtaining first zone information that corresponds to the zone; and
 obtaining second zone information that corresponds to a different zone of each document of the set of documents,
  the zone information including the first zone information and the second zone information.

14. The method of claim 10, where providing the second batch file including the set of converted documents comprises:
 providing the second batch file, including the set of converted documents, to a shared memory storage location,
  the shared memory storage location being accessible by the user device.

15. The device of claim 1, where the one or more processors, when determining the zone information, are to:
    determine the zone information based on at least one of:
        a height associated with the zone,
        a width associated with the zone, or
        a type of information included in the zone.

16. The device of claim 1, where the one or more processors, when obtaining the first batch file including the set of documents, are to:
    obtain the first batch file including the set of documents from a shared memory storage location accessible by a user device.

17. The device of claim 1, where the zone information further comprises:
    third information that corresponds to a different zone of each document, of the set of documents, that is to be converted.

18. The computer-readable medium of claim 5, where the zone information further comprises:
    third information that identifies a type of information included in the zone.

19. The computer-readable medium of claim 5, where the zone information further comprises:
    third information that corresponds to a different zone of each document, of the plurality of documents, that is to be converted.

20. The method of claim 10, where the zone information further comprises:
    third information that identifies one or more of a height or a width of the zone.

* * * * *